(12) United States Patent
Mildner et al.

(10) Patent No.: US 9,580,109 B2
(45) Date of Patent: Feb. 28, 2017

(54) REAR END REINFORCEMENT STRUCTURE FOR A MOTOR VEHICLE BODY

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/727,066

(22) Filed: Jun. 1, 2015

(65) Prior Publication Data

US 2015/0344072 A1 Dec. 3, 2015

(30) Foreign Application Priority Data

May 31, 2014 (DE) .................... 20 2014 004 652 U

(51) Int. Cl.
*B62D 25/08* (2006.01)
*B62D 21/15* (2006.01)
*B62D 25/20* (2006.01)

(52) U.S. Cl.
CPC ............ *B62D 21/152* (2013.01); *B62D 25/08* (2013.01); *B62D 25/087* (2013.01); *B62D 25/088* (2013.01); *B62D 25/2027* (2013.01); *B62D 25/2036* (2013.01)

(58) Field of Classification Search
CPC .... B62D 25/08; B62D 21/152; B62D 25/2027
USPC ....................................... 296/187.11, 193.08
See application file for complete search history.

(56) References Cited

U.S. PATENT DOCUMENTS

| | | | |
|---|---|---|---|
| 4,973,103 A | 11/1990 | Imajyo et al. | |
| 6,099,039 A | 8/2000 | Hine | |
| 6,102,605 A | 8/2000 | Emmons | |
| 6,193,273 B1 | 2/2001 | Novak et al. | |
| 6,533,348 B1 | 3/2003 | Jaekel et al. | |

(Continued)

FOREIGN PATENT DOCUMENTS

| | | |
|---|---|---|
| DE | 10036399 A1 | 2/2002 |
| DE | 102010018470 A1 | 11/2011 |

(Continued)

OTHER PUBLICATIONS

German Patent Office, German Search Report for German Application No. 202014004652.2, dated Mar. 11, 2015.

(Continued)

*Primary Examiner* — H Gutman
(74) *Attorney, Agent, or Firm* — Lorenz & Kopf LLP

(57) ABSTRACT

A rear-side reinforcement structure for a motor vehicle body includes at least one side member extending in vehicle longitudinal direction, a shock absorber reinforcement profile and an outer rear end reinforcement profile. The shock absorber reinforcement profile is connected to the side member with a lower front profile section located in travelling direction at the front. The shock absorber reinforcement profile is connected to the rear end reinforcement profile with a rear profile section that is spaced from the side member and facing a rear end of the body. The outer rear end reinforcement profile extends from the rear profile section of the shock absorber reinforcement profile to the side member and with a lower connection section is connected to the side member.

20 Claims, 9 Drawing Sheets

(56) References Cited

U.S. PATENT DOCUMENTS

| | | | | |
|---|---|---|---|---|
| 6,729,682 B2* | 5/2004 | Delavalle | ............... | B62D 25/08 296/193.08 |
| 6,824,204 B2* | 11/2004 | Gabbianelli | ......... | B62D 21/152 296/193.06 |
| 6,846,037 B2 | 1/2005 | Engels et al. | | |
| 7,717,496 B2* | 5/2010 | Ebina | ..................... | B62D 43/02 296/187.12 |
| 8,011,718 B2* | 9/2011 | Tsuyuzaki | .............. | B62D 25/08 296/193.08 |
| D690,618 S* | 10/2013 | Gordon | .......................... | D12/82 |
| 8,585,130 B2* | 11/2013 | Gonin | ..................... | B60J 5/101 296/187.11 |
| 8,919,866 B2* | 12/2014 | Freeman | .............. | B62D 29/005 296/193.05 |
| 8,919,869 B2* | 12/2014 | Horiguchi | ............ | B62D 25/087 296/193.08 |
| 8,991,906 B2* | 3/2015 | Shimizu | ............... | B62D 25/087 296/193.08 |
| 9,010,847 B2* | 4/2015 | Katou | .................. | B62D 25/087 296/193.08 |
| 9,156,499 B2* | 10/2015 | Mildner | ................. | B62D 25/02 |
| 2011/0260503 A1 | 10/2011 | Fujii et al. | | |

FOREIGN PATENT DOCUMENTS

| | | |
|---|---|---|
| DE | 102010024716 A1 | 12/2011 |
| DE | 102010024737 A1 | 12/2011 |
| DE | 102012008561 A1 | 10/2012 |
| JP | 2004268825 A | 9/2004 |
| JP | 2005231435 A | 9/2005 |

OTHER PUBLICATIONS

Great Britain Patent Office, Great Britain Search Report for Great Britain Application No. 1508324.9, dated Dec. 10, 2015.

* cited by examiner

A-A

B-B

D-D

E-E

G-G

F-F

REAR END REINFORCEMENT STRUCTURE FOR A MOTOR VEHICLE BODY

CROSS-REFERENCE TO RELATED APPLICATION

This application claims priority to German Patent Application No. 202014004652.2, filed May 31, 2014, which is incorporated herein by reference in its entirety.

TECHNICAL FIELD

This present disclosure pertains to a motor vehicle body with a rear end reinforcement structure, as well as a motor vehicle with such a motor vehicle body.

BACKGROUND

Motor vehicles with a sloping rear body typically have a rear end reinforcement structure in order to structurally reinforce the region of a rear opening that can be closed with a trunk lid.

For example, DE 10 2010 018 470 A1 discloses a rear section for a motor vehicle body with two rear side members, a rear floor extending between the rear side members and with a rear cross member including a profile section connecting the rear side members. Here, the profile section is arranged above the rear side members crossing the same. Because of an offset in height between rear side members and rear cross member, the rear cross member can reach out beyond the side members in lateral direction. As a consequence of this, a side wall and/or a wheel housing of the rear section can be directly fastened to the cross member.

SUMMARY

The present disclosure provides an improved connection of a side wall and in particular a wheel housing, to the rear end reinforcement structure. In the rear region, and in particular at the transition from a side wall into the vehicle rear, the body presents improved structural and torsional stiffness. In addition, the weight of the motor vehicle body as well as a use of material for its production is to be reduced. In addition to improved occupant and pedestrian protection, the motor vehicle body is shown to provide a high degree of durability and good acoustic insulation.

Accordingly, a motor vehicle body with a rear end reinforcement structure is provided. The rear end reinforcement structure can in particular run about the trunk opening that can be closed by a trunk lid. The reinforcement structure in this case can be additionally configured as a hollow profile frame running about the rear opening, which can impart a high degree of torsional stiffness to the entire motor vehicle body.

Here, the reinforcement structure includes at least one side member extending in vehicle longitudinal direction (x), a shock absorber reinforcement profile and an outer rear end reinforcement profile. Typically, the motor vehicle body in each case includes on a left and on a right outside a side member, a shock absorber reinforcement profile and an outer rear end reinforcement profile. The shock absorber reinforcement profile is connected to the side member with a lower front profile section located at the front in travelling direction of the motor vehicle body. The shock absorber reinforcement profile further includes a rear profile section that is spaced from the side member and faces a rear end of the motor vehicle body.

The rear profile section of the shock absorber reinforcement profile is connected to the outer rear end reinforcement profile. The outer rear end reinforcement profile in turn extends from the rear profile section of the shock absorber reinforcement profile to the side member. It is furthermore connected to the side member with a lower connection section.

By means of the outer rear end reinforcement profile, a rear end of the shock absorber reinforcement profile that is free and projecting from the side member can be supported on the side member. The outer rear end reinforcement profile in this respect functions as a support strut for the shock absorber reinforcement profile.

Typically, the shock absorber reinforcement profile can be directly connected with its lower or front profile section to a spring plate, which can be connected to shock absorber or a wheel suspension. The shock absorber reinforcement profile in this regard makes available a structural reinforcement for the chassis connection to the motor vehicle body. The forces which are introduced into the motor vehicle body via the chassis, in particular via the wheel suspension or spring suspension, can be received via the shock absorber reinforcement profile and discharged in the self-supporting motor vehicle body in a controlled manner.

By way of the outer rear end reinforcement profile, which typically extends substantially in vehicle vertical direction (z), the shock absorber reinforcement profile and its connection to the floor structure of the motor vehicle can be improved. By means of the outer rear end reinforcement profile, a better force introduction or force distribution from the shock absorber reinforcement profile into the rear end reinforcement structure is additionally made possible.

According to a further configuration, the side member, the shock absorber reinforcement profile and the outer rear end reinforcement profile form a closed reinforcement frame. This reinforcement frame typically extends in the plane formed by vehicle longitudinal direction (x) and vehicle vertical direction (z). By forming a circumferential reinforcement frame that is closed in itself the shock absorber reinforcement profile can be further stiffened and structurally reinforced. By means of that structural reinforcement it is possible, furthermore, the reduce the use of material for the shock absorber reinforcement profile, as a result of which the vehicle weight can be reduced with structural stiffness remaining at least the same or even being improved.

According to a further configuration, the shock absorber reinforcement profile has an L-shaped contour. The front profile section of the shock absorber reinforcement profile and the rear profile section can be aligned approximately at a right angle to one another. The front profile section can substantially extend vertically upwards, i.e. in vehicle vertical direction (z), while the rear profile section substantially runs in vehicle longitudinal direction (x).

The shock absorber reinforcement profile can come to lie in particular on the outside of a wheel housing of a side wall of the motor vehicle body and be closed off in particular through the connection to the side wall subject to forming a closed hollow profile. Here it can be provided in particular that the rear profile section abuts an upper section of the wheel housing which, based on the vehicle transverse direction (y), projects towards the outside approximately in the shape of an arc and towards the rear, facing the vehicle rear end, closes off approximately with the wheel housing or the associated side wall.

Because of its L-shaped contour, the shock absorber reinforcement profile extends from a spring plate, which is spaced from the vehicle rear end, as far as to the vehicle rear end, typically as far as to a rear end reinforcement ring enclosing the rear end opening. The forces introduced into the floor structure and into the motor vehicle body via the rear wheels can thus be introduced via the shock absorber reinforcement profile not only into the side wall but also directly into a rear end reinforcement ring.

According to a further configuration, the rear profile section of the shock absorber reinforcement profile is connected to a wheel housing. The wheel housing is typically an integral part of an inner side wall. Through the direct connection of the shock absorber reinforcement profile to the wheel housing, a direct force distribution or force introduction over a comparatively large area from the shock absorber reinforcement profile into the side wall of the motor vehicle body can take place. In addition, the side wall or the wheel housing of the side wall can be subjected to additional supporting and structural reinforcement in the region of the rear profile section of the shock absorber reinforcement profile. In this regard, the material thickness and the weight of the side wall can also be reduced for example to reduce weight or optimize installation space.

According to a further configuration, the motor vehicle body, in particular its rear end reinforcement structure includes a rear wall that extends in vehicle transverse direction (y), which extends over the rear end sections of a left and a right side member. The rear wall typically extends in the plane formed by vehicle transverse direction (y) and vehicle vertical direction (z). In that the rear wall is structurally connected to both the left and also to the right side member, it typically constitutes it transverse connection in the rear region of the motor vehicle which reinforces the structure or stiffens the body in addition to a rear end cross member of the floor structure of the motor vehicle body that is present anyway.

According to a further configuration, the outer rear end reinforcement profile is connected to the rear wall. Since the outer rear end reinforcement profile is typically part of the already described reinforcement frame, that reinforcement frame formed by shock absorber reinforcement profile, side member and outer rear end reinforcement profile can also be directly structurally connected to the rear wall through the connection of the outer rear end reinforcement profile to the rear wall. By connecting the outer rear end reinforcement profile to the rear wall, an additionally improved force introduction and force transmission from the shock absorber reinforcement profile into the vehicle rear end, consequently into the rear wall can be made available.

In a further development thereof, the rear wall is additionally provided with a rear wall reinforcement profile which extends parallel to the rear end cross member on the floor side. The rear end cross member typically extends in vehicle transverse direction (y) between the side members running parallel to one another and in vehicle longitudinal direction (x). The rear wall reinforcement profile that is structurally connected to the rear wall, can, in addition to the actual rear end cross member, provide a further transverse reinforcement of the vehicle rear end, in particular of the rear end reinforcement structure.

Furthermore, it can be provided according to a further development, that the rear end cross member is configured largely open towards the back, against the travelling direction of the motor vehicle body or of the motor vehicle and is closed off by the rear wall. The rear end cross member in this case can be additionally formed by two half shells or cross member profiles corresponding to one another typically a lower rear end cross member profile and an upper rear end cross member profile. Rear end upper and lower end sections of upper and lower rear end cross member profile can come to lie spaced from one another in vehicle vertical direction (z). In particular, upper and lower rear end cross member profile accordingly can include flange sections which are connected to the rear wall that is substantially configured flat at least in sections.

In this regard, at least the region of the rear wall that is connected to upper and lower rear end cross member profile can function as closing plate for the rear end cross member in a manner of speaking. By way of the rear wall connection, the outer rear end reinforcement profile, which with respect to the vehicle transverse direction (y) is located outside the outer ends of the rear end cross member, can be indirectly connected to the rear end cross member.

According to a further configuration, the motor vehicle body furthermore includes an inner side wall with a rear end inner edge profile. Here, the edge profile is connected to the rear end cross member and to the rear wall. The inner side wall can additionally include the already mentioned wheel housing. In particular, the wheel housing that is curved inwardly can be an integral part of the inner side wall of the motor vehicle body. The inner edge profile extends on the rear or rear end of the inner side wall towards the inside, towards the vehicle middle and is typically configured as a part of a rear end reinforcement ring, which bounds or completely encloses the rear end opening of the motor vehicle body.

Because of the fact that the inner edge profile is connected to the rear end cross member and to the rear wall, a multiple connection of the inner side wall to components running in vehicle transverse direction can be made available in the lower rear end region of the body rear end. As a result, a further improved force introduction and force transmission from the side wall into the vehicle rear end is made possible.

According to a further configuration, the motor vehicle body furthermore includes an outer side wall with an outer edge profile. Here, the outer edge profile typically comes to lie overlapping the inner edge profile of the inner side wall. Typically, outer and inner edge profile form a hollow profile which approximately extends from the lower load compartment edge of the vehicle rear end as far as to the vehicle roof. The configuration of inner and outer side wall that is complementary to one another can form a hollow profile structure which can improve stability and torsional stiffness to the rear end reinforcement structure.

According to a further configuration, the outer side wall is connected to the rear wall with a lower end section of its outer edge profile. Through the connection to the rear wall, a lower end of the outer edge profile projecting downwards can be subjected to a direct support and structural reinforcement. It can be provided in particular that the inner edge profile of the inner side wall, as well as the outer edge profile is at least connected to the rear wall. Furthermore, the lower end section of the outer edge profile, based on the vehicle vertical direction (z), can come to lie above the rear wall reinforcement profile so that the outer edge profile ends above the rear wall reinforcement profile. The inner edge profile can in particular extend further downwards and project as far as to the rear end cross member on the floor side and be structurally connected in part directly overlapping the same.

According to a further configuration, the inner side wall includes a connecting section for a rear roof cross member that projects to the inside in vehicle transverse direction. Typically, both inner side walls located opposite in vehicle transverse direction each include a connecting section for the rear roof cross member which can be arranged on the two side wall-side connection sections. The roof cross member can in particular be configured of two shells and accordingly include two approximately L-shaped roof cross member profiles, the long ends of which can be structurally connected in each case to the left and right connection section of left and right side wall.

According to a further configuration, the rear roof cross member, the outer edge profile, the inner edge profile together with the rear wall and one of rear wall reinforcement profile and rear cross member of the floor side form a reinforcement ring enclosing the rear end opening. The reinforcement ring is designed in particular continuously and circumferentially about the rear end opening. Via the roof cross member, it is also incorporated in the roof structure and via the rear end cross member of the floor side or via the rear wall reinforcement profile also in the floor structure of the motor vehicle body. The outer rear end reinforcement profile can be incorporated in the rear end reinforcement ring and via its direct connection to the rear wall directly discharge and transmit the forces acting via the shock absorber reinforcement profile in vehicle longitudinal direction (x) into the rear end reinforcement ring.

By providing the outer rear end reinforcement profile, which with respect to the vehicle transverse direction (y) runs outside of inner edge profile and outer edge profile, additional reinforcements, for example in the motor vehicle interior or on the inside on the inner or outer side wall become dispensable. A loading volume or through-loading width of the rear end opening, which is typically bounded by the insides of the wheel housings located opposite, can even be enlarged in this manner.

According to a further aspect, a motor vehicle with a previously described motor vehicle body is finally provided which includes a corresponding rear end reinforcement structure.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
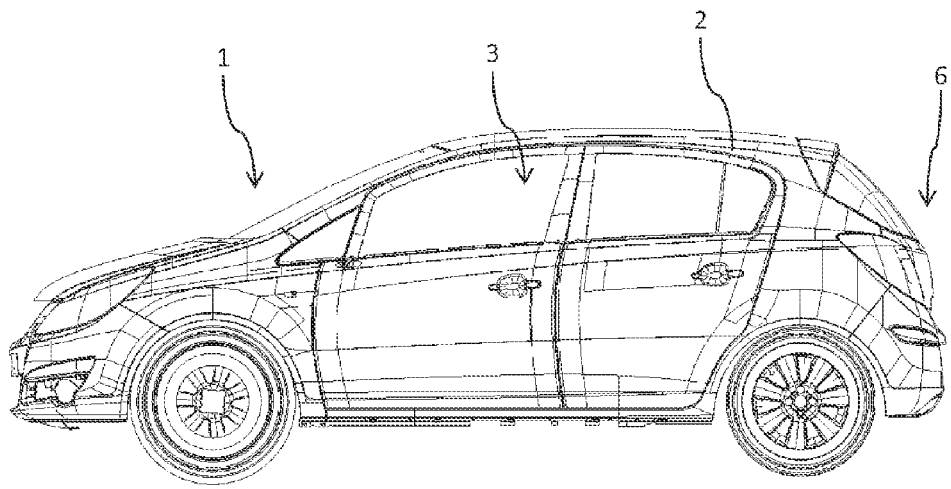
FIG. 1 illustrates a schematic lateral view of a motor vehicle.
Figure 2:
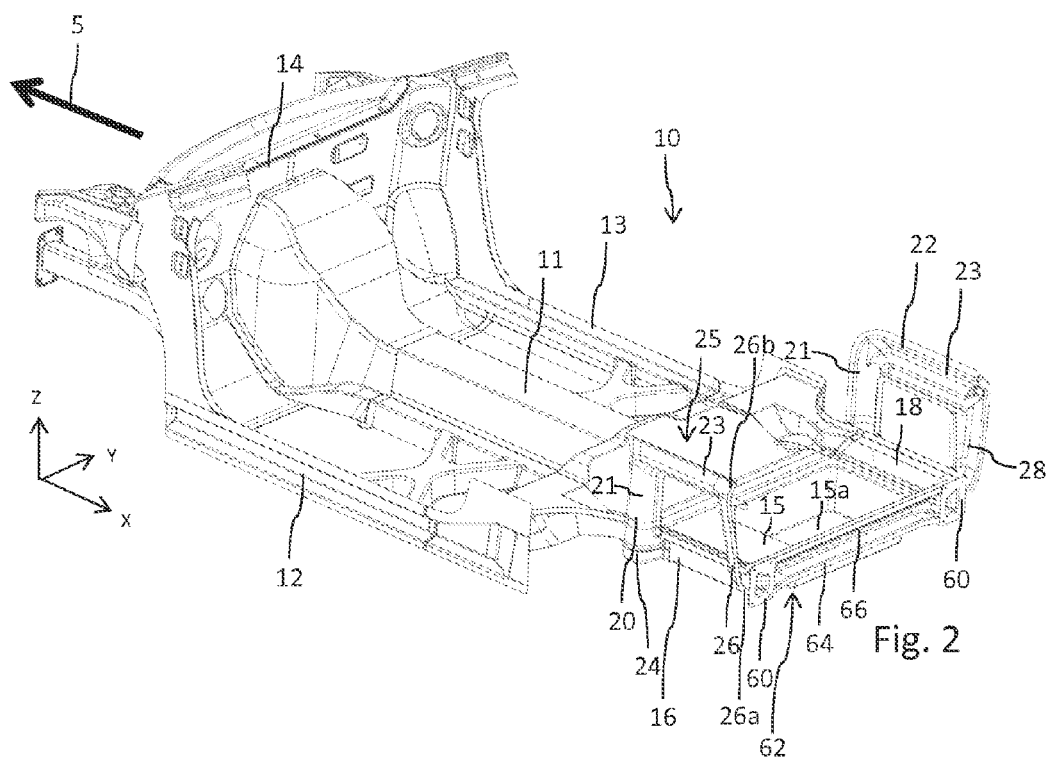
FIG. 2 illustrates a perspective representation of a floor structure of a motor vehicle body viewed obliquely from the top back.

The motor vehicle 1 schematically shown in lateral view in FIG. 1 includes a self-supporting motor vehicle body 2 with a passenger cell 3 and with a rear end 6. In FIG. 2, a part of the motor vehicle body 2, namely its floor structure 10, is shown in perspective representation obliquely from the hack. There, the travelling direction 5 of the motor vehicle 1 is marked by an arrow. Approximately below the passenger cell 3 later on, the floor structure 10 includes lateral sills 12, 13 located outside and extending in vehicle longitudinal direction (x), which towards the front, in travelling direction 5, merge into a front wall 14 separating the passenger cell 3 from the engine compartment located in front of that.

A center tunnel 11 extends approximately in the middle between the lateral sills 12, 13 and projects from the front wall 14 as far as into the rear end region, typical as far as to a heel plate. At the rear end, the floor structure 10 includes a left and a right side member 16, 18, which come to lie offset to the inside relative to the lateral sills 12, 13. The left side member 16 and the right side member 18 extend in vehicle longitudinal direction (x). Above the side members 16, 18, a floor panel 15 which is merely rudimentarily indicated in FIG. 2 is provided, which in the shown exemplary embodiment in FIG. 2 can also be provided with a trough 15a or with a tub-like depression in the region between the side members 16, 18, for example for maximizing a loading volume of the motor vehicle 1.

Furthermore, the motor vehicle body 2 is provided with two shock absorber reinforcement profiles 20, 22, which extend from a spring plate 24 upwards and to the back, facing the vehicle rear end 6. The shock absorber reinforcement profiles 20, 22 serve to structurally reinforce the spring plates 24 which are abutted by a wheel suspension which is not explicitly shown or spring suspension of the chassis of the motor vehicle and via which forces from the chassis can be introduced into the floor structure 10, thus into the motor vehicle body 2.

The left and right shock absorber reinforcement profiles 20, 22 each have a front profile section 21 substantially extending upwards in vehicle vertical direction (z) and a rear profile section 23 adjoining the upper end of the front profile section 21 and unitarily connected therewith. The rear profile section 23 typically extends in vehicle longitudinal direction (x) towards the rear end 6. The rear free end of the rear profile section 23 in this respect comes to lie above the rear end of the respective side member 16, 18.

To structurally reinforce the left and right reinforcement profiles 20, 22, an outer rear end reinforcement profile each, namely a left rear end reinforcement profile 26 and right rear end reinforcement profile 28 is provided. The two outer rear end reinforcement profiles 26, 28 each extend from the rear end of the rear profile section 23 of the left or of the right shock absorber reinforcement profile 20, 22 downwards to the respective left or right side member 16, 18. The outer rear end reinforcement profiles 26, 28 thus form a kind of strut for the rear end of the substantially L-shaped left and right shock absorber reinforcement profiles 20, 22. The lower end sections 26a of the outer rear end reinforcement profiles 26, 28 are connected to the longitudinal ends of the respective side members 16, 18 in a structural, i.e. load-transmitting manner.

The left shock absorber reinforcement profile 20, the left outer rear end reinforcement profile 26 and the left side member 16 configured in this region form a closed reinforcement frame 25, which substantially extends in the plane formed by vehicle vertical direction (z) and vehicle longitudinal direction (x). Obviously the same applies also to the right shock absorber reinforcement profile 22 and to the right outer rear end reinforcement profile 28 as well as to the right side member 18.

The further features of the motor vehicle body 2, its rear end reinforcement structure 8 and a rear end reinforcement ring 29 are described in the following merely making reference to the left vehicle side. However, they are equally present and accordingly provided also on the right vehicle side.

FIG. 2, at the same time, shows a first expansion stage of the motor vehicle body 1 in the form of the floor structure 10 with the left and right shock absorber reinforcement profiles 20, 22 arranged thereon and the two outer rear end reinforcement profiles 26, 28. The floor structure 10 includes a floor-side rear end cross member 62 facing the rear end 6, i.e. facing away from the travelling direction 5, which, as is evident from the cross section according to FIG. 11, includes a lower rear end cross member profile 64 and an upper rear end cross member profile 66.

Figure 15:
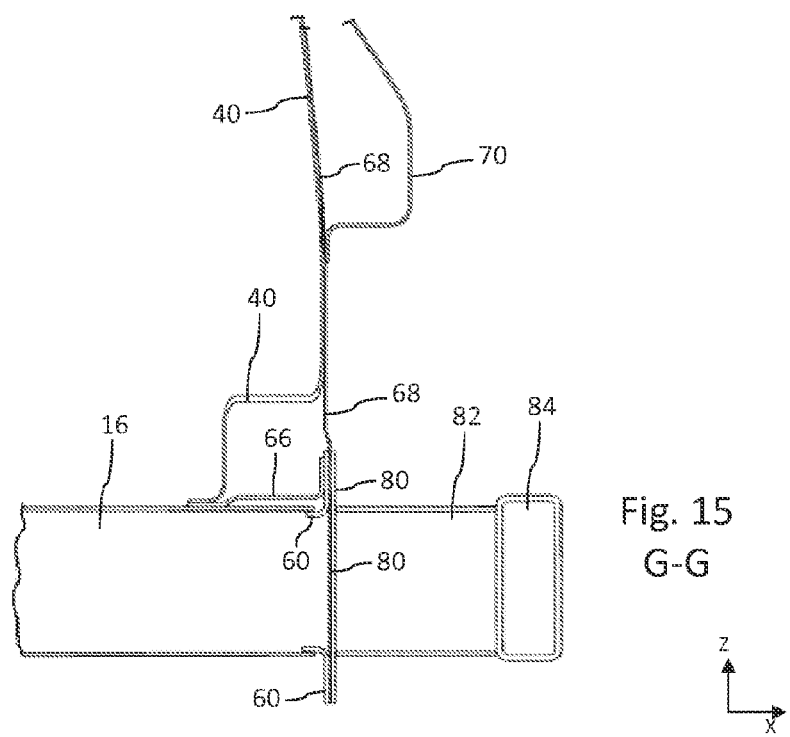
FIG. 15 shows a cross section through the assembly according to FIG. 14 along G-G.

On the longitudinal ends of the side members 16, 18, anchor plates 60 are arranged, furthermore, via which the deformation elements 82 shown in cross section in FIG. 15 are arranged on the side member 16 concerned via a connection plate 80. Deformation elements 82, which can be typically configured as crash box, are typically connected to a bumper cross member 84 shown in cross section in FIG. 15, so that for example in the event of a rear end impact on the motor vehicle body 2, the deformation elements 82 can be subjected to an intended deformation subject to absorbing mechanical energy.

Figure 3:
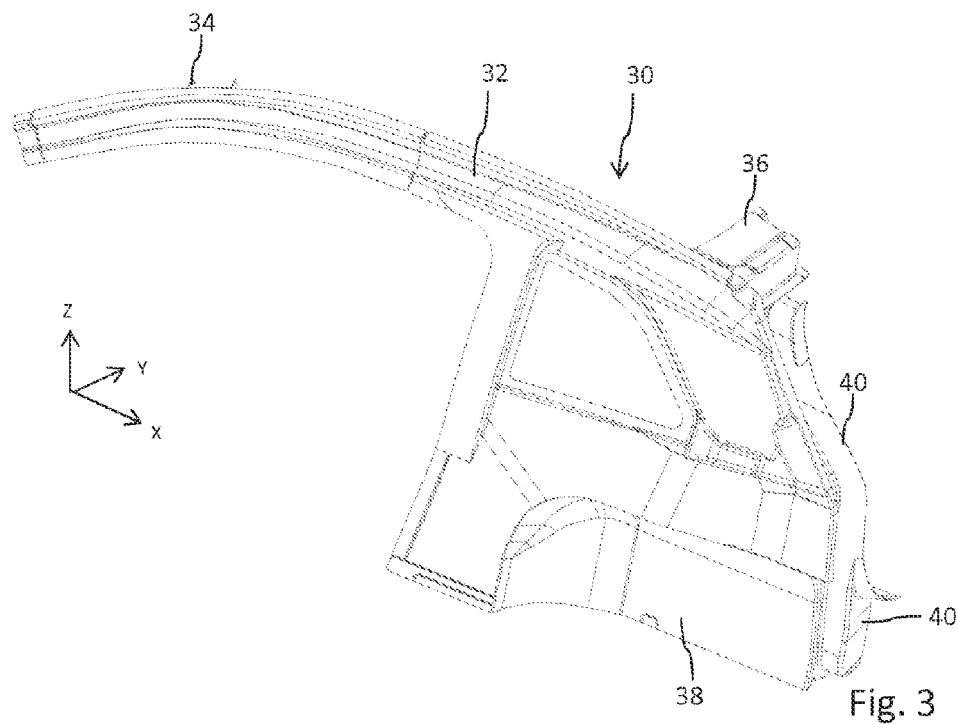
FIG. 3 illustrates a perspective representation of an inner side wall.
Figure 4:
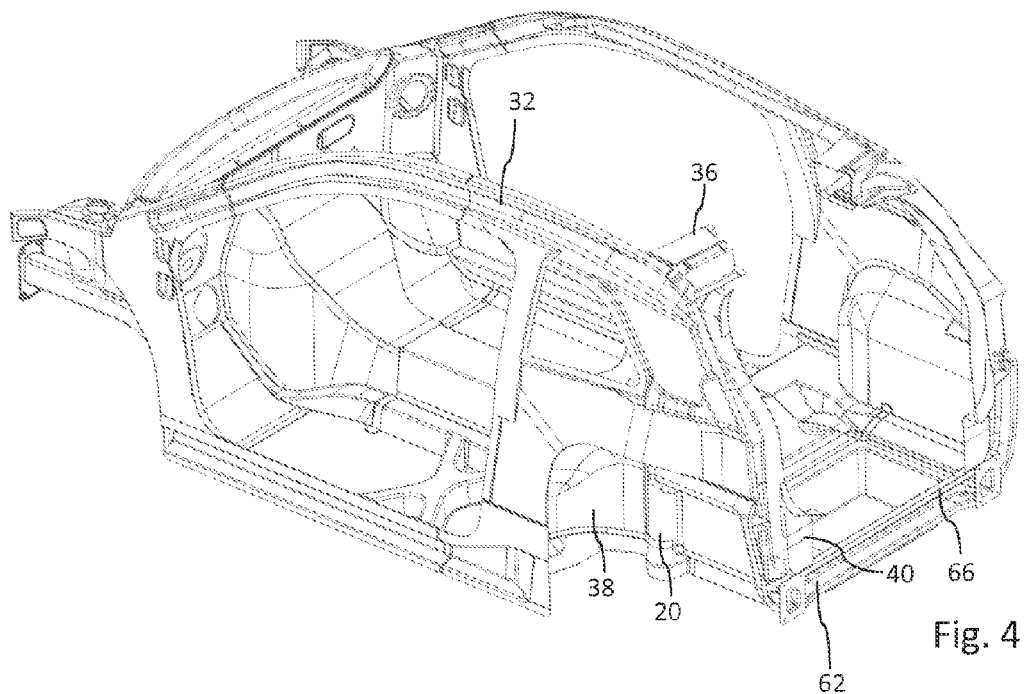
FIG. 4 shows the side wall according to FIG. 3 in assembly position on a floor structure according to FIG. 2.

In FIG. 3, an inner side wall 30 of the motor vehicle body 2 is shown in isolated representation obliquely from the outside. The inner side wall 30 includes an inner roof frame 32 longitudinally extending from the region of a windshield as far as to the rear end of the motor vehicle 1. On the rear end, i.e. on the rear end section of the roof frame 32 a rear connection section 36 for a rear roof cross member 45 projecting to the inside is provided. At the rear end, i.e. against the travelling direction 5, the inner side wall 30 is bounded by an inner edge profile 40 projecting to the inside in vehicle transverse direction (y). On the lower rear end of the inner side wall 30 an inwardly curved wheel housing 38 is provided.

In the second expansion stage, the inner side wall 30 is fastened from the inside to the floor structure 10 shown in FIG. 2. The inner edge profile 40 in the process, with a lower end section 40a projecting inwardly in vehicle transverse direction (y), comes to lie on the floor-side rear end cross member 62, in particular on an upper rear end cross member profile 66, as is evident from the cross section of FIG. 16. Furthermore, the inner side wall 30 from the outside comes to lie against the outer rear end reinforcement profile 26.

Figure 16:
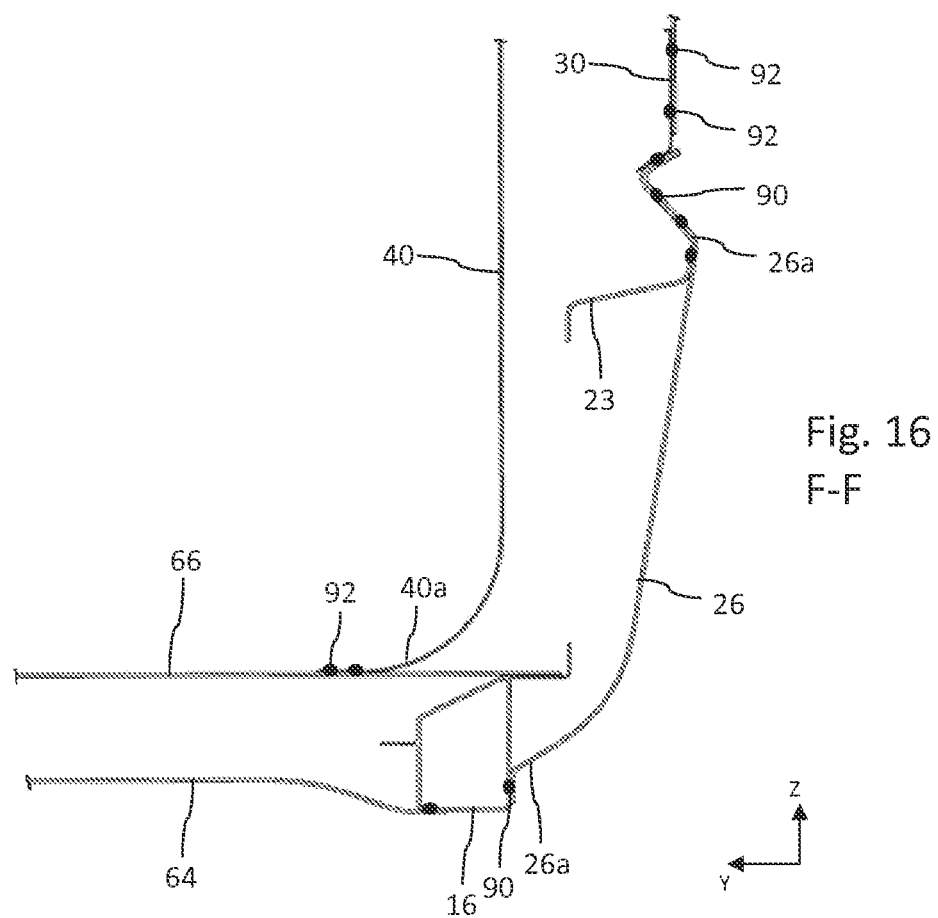
FIG. 16 shows a cross section through the assembly according to FIG. 8 along F-F.

In FIG. 16 it is clearly evident that an upper end section 26b of the outer rear end reinforcement profile 26 extends from the rear profile section 23 of the left shock absorber reinforcement profile 20 downwards to the left outside of the left side member 16. As is shown in FIG. 16, the outer rear end reinforcement profile 26 is structurally connected with a lower end section 26a to the left side member 16.

Various connection points 90, 92, 94 realized in the different expansion stages are each shown in the various representations of the figures. Connections of adjoining components of the motor vehicle body can be realized in different manners. Welded connections, bonded connections, screwed connections, riveted connections, or clinched connections, as well as any combination thereof are conceivable. Welded connections in this case can be configured as laser welded connection or as spot welded connection.

Figure 5:
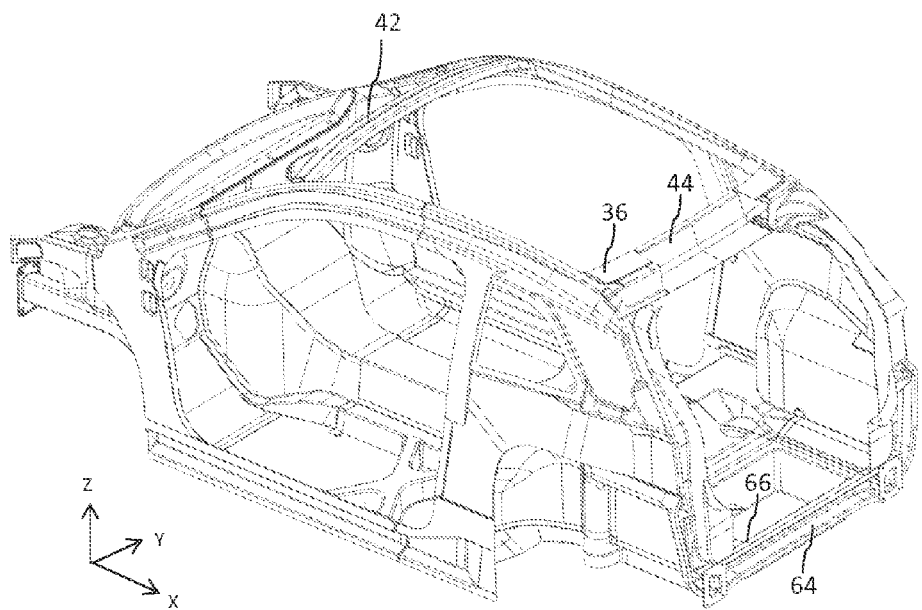
FIG. 5 shows the body assembly according to FIG. 4 in addition with rear and front roof cross member.

In the second expansion stage shown in FIG. 5, a front roof cross member 42 can be arranged on the one hand between the front connection sections 34 of the left and right side wall 30 which are located opposite one another. Furthermore, one of the roof cross member profiles 44 can be arranged between the connection sections 36 of left side wall 30 and right side wall which are located opposite one another and connected to the respective rear connection sections 36. The rear left connection section 36 includes, as shown in the cross section of FIGS. 12 and 13, a lower profile section 36a and an upper profile section 36b, which complement one another in each case by an approximately L-shaped cross-section contour to form a closed hollow profile.

The roof cross member profile 44 shown in FIGS. 5 and 7 can be connected to the rear connection sections 36 from the bottom and from the front while the upper rear roof cross member profile 46 corresponding to the same is only fitted from above after the assembly of an outer side wall 50 in an expansion stage later on. An overlapping arrangement of rear roof cross member profile 46 and upper profile section 36b of the rear connection section 36 of the inner side wall with an outer edge profile 54 of the outer side wall 50 resulting from this is evident in FIG. 13.

Figure 6:
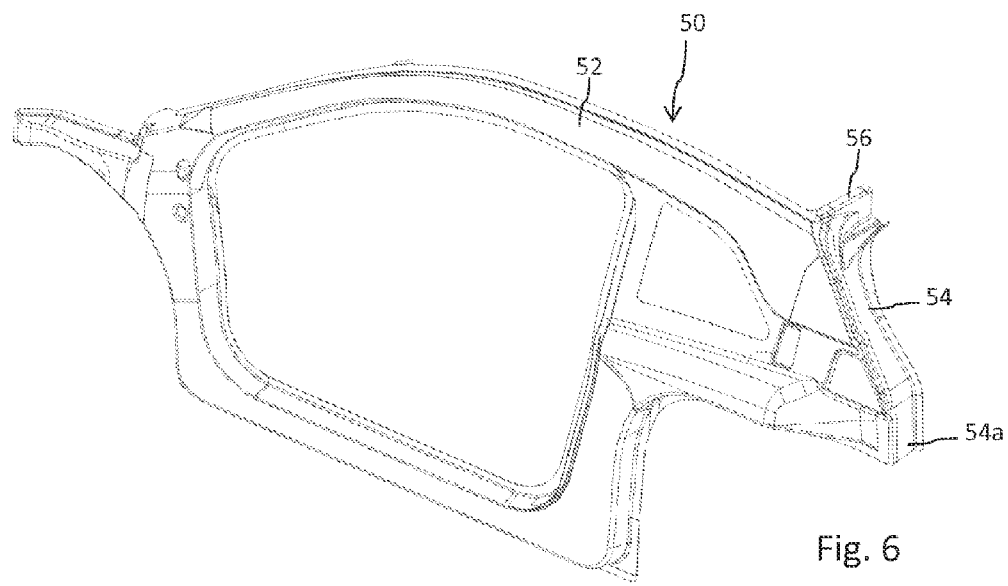
FIG. 6 illustrates a perspective representation of an outer side wall.
Figure 12:
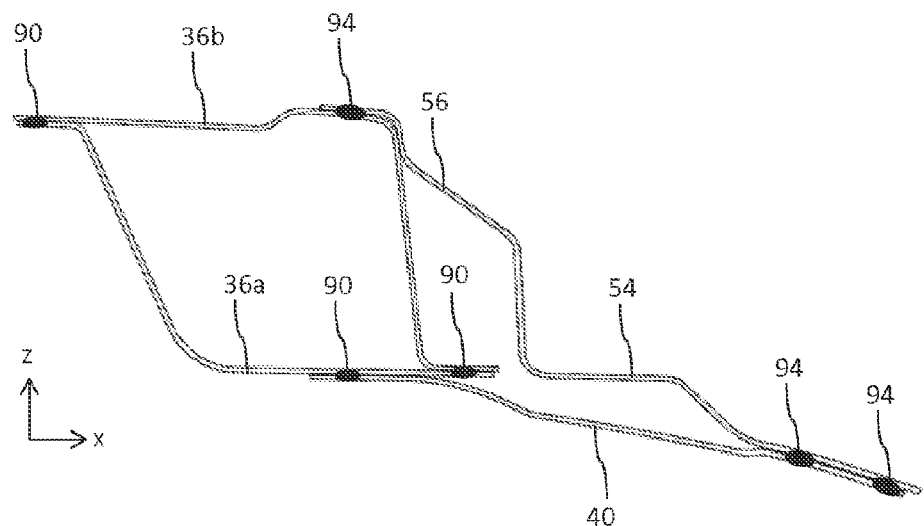
FIG. 12 shows a cross section through the assembly according to FIG. 7 along D-D.
Figure 13:
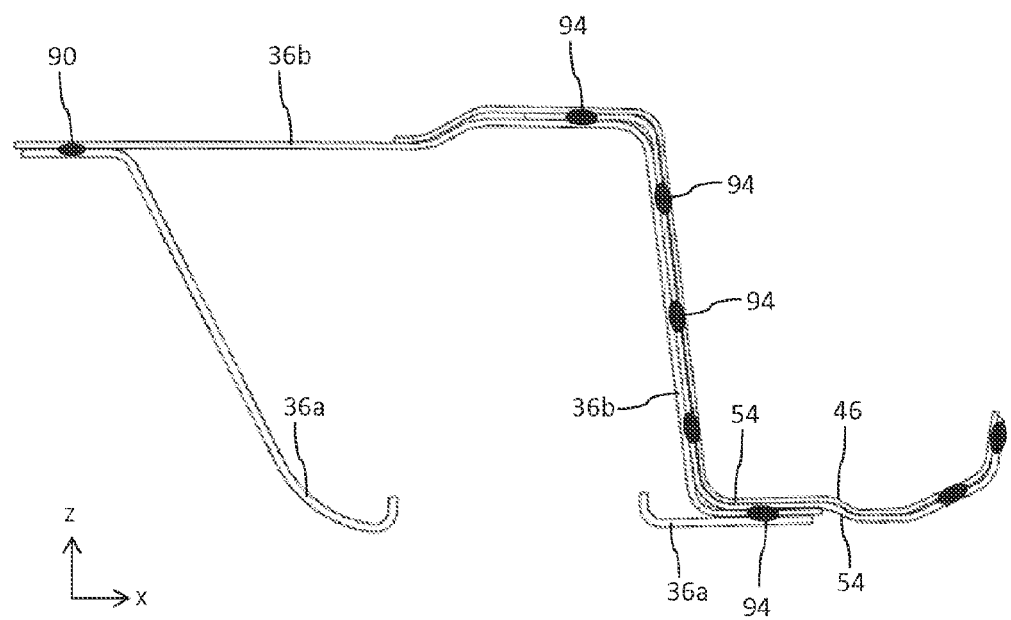
FIG. 13 shows a cross section through the assembly according to FIG. 8 along E-E.
Figure 14:
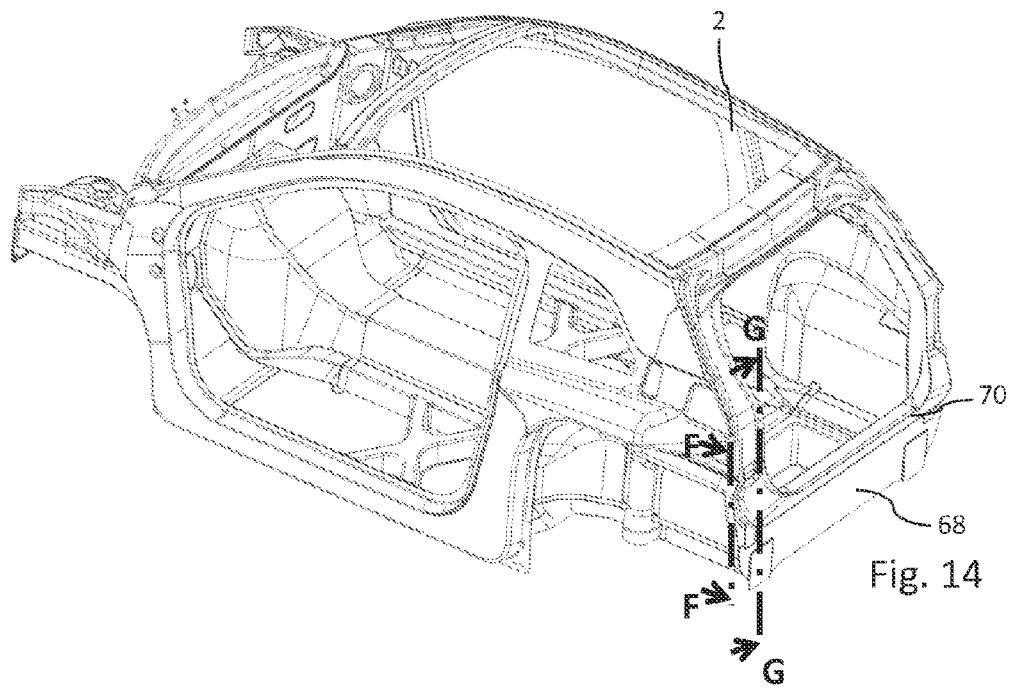
FIG. 14 illustrates a further perspective representation of the assembly.

In a further expansion stage, an outer side wall 50, which is shown isolated in FIG. 6, is fitted from the outside onto the assembly shown in FIG. 5 and structurally connected to the same. In the rear end region, the outer side wall 50 includes an outer edge profile 54 which towards the bottom is bounded by the wheel housing, which towards the top, at the transition to an outer roof frame 52 projecting to the front includes a rear connection section 56 projecting to the inside in vehicle transverse direction (y). The rear connection section 56 in assembly position rests on the upper profile section 36b of the rear connection section 36 of the inner side wall 30, as is shown in FIG. 12.

The outer edge profile 54 unitarily adjoining thereon in the process comes to lie at least in regions overlapping the inner edge profile 40 of the inner side wall 30. The connection points 92 to be realized in this expansion stage are shown in the various figures.

Figure 8:
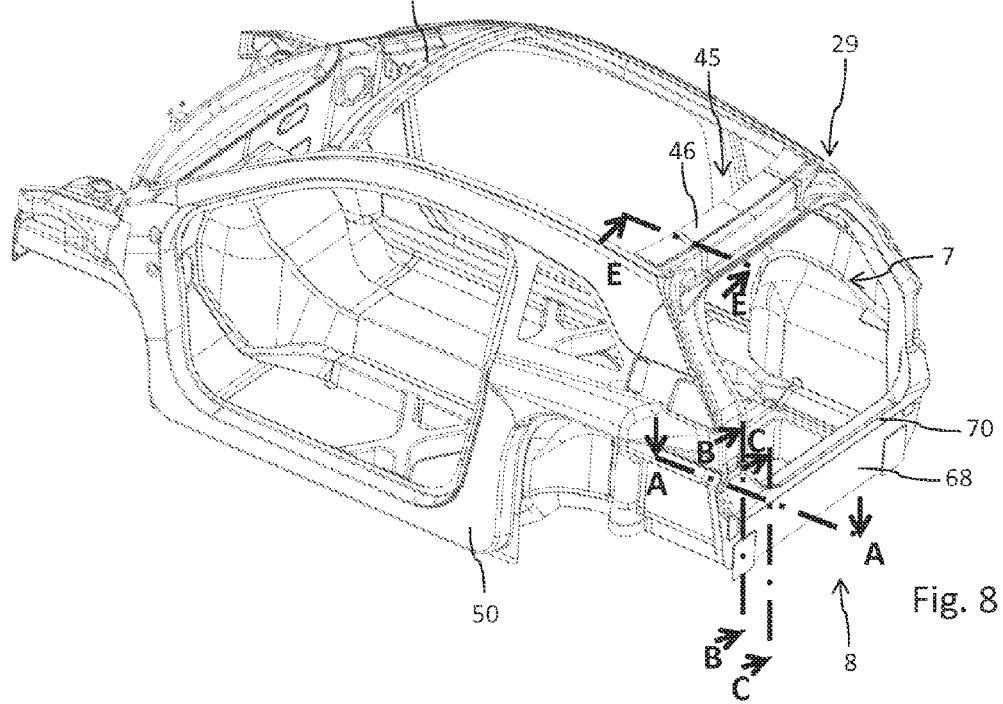
FIG. 8 shows a perspective representation of the assembly according to FIG. 7 with a rear wall.

Accordingly, in a further expansion stage in FIG. 8, a rear wall 68 can be fastened to the rear end 6 of the motor vehicle body 2. The connection points 94 to be realized here are likewise shown in the various views and cross sections.

Figure 7:
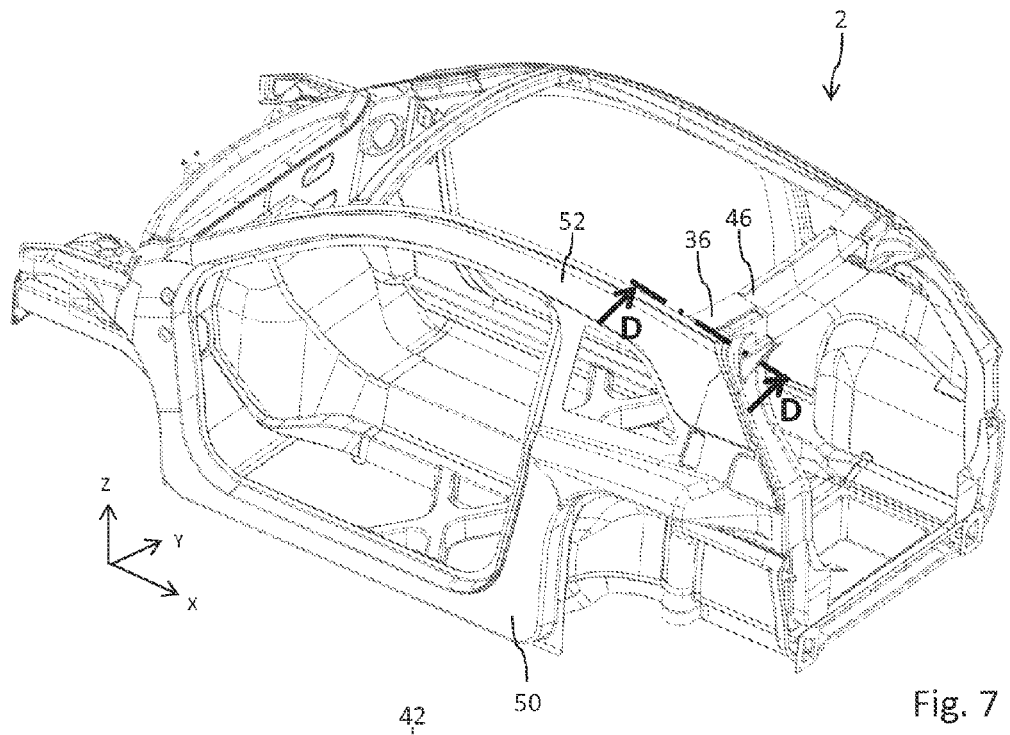
FIG. 7 shows the side wall according to FIG. 6 mounted according to FIG. 5 in assembly position on the assembly.

In the expansion stage shown in FIG. 7, the rear wall structure formed by rear wall 68 and rear wall reinforcement profile 70 can be arranged from the back on the rear end 6 of the motor vehicle body 2 and connected therewith. The rear wall 68 which is configured substantially flat and extends over almost the entire width between left and right side member 16, 18 in this case functions as a kind of closing plate for the upper and lower rear end cross member profiles 66, 64 that are configured open towards the back, as is evident from FIG. 11. The rear wall reinforcement profile 70 extending over the entire width of the rear end opening 7 and also over the entire width of the rear wall 68 is arranged in the expansion stage shown in FIG. 8, above the floor-side rear end cross member 62.

Figure 10:
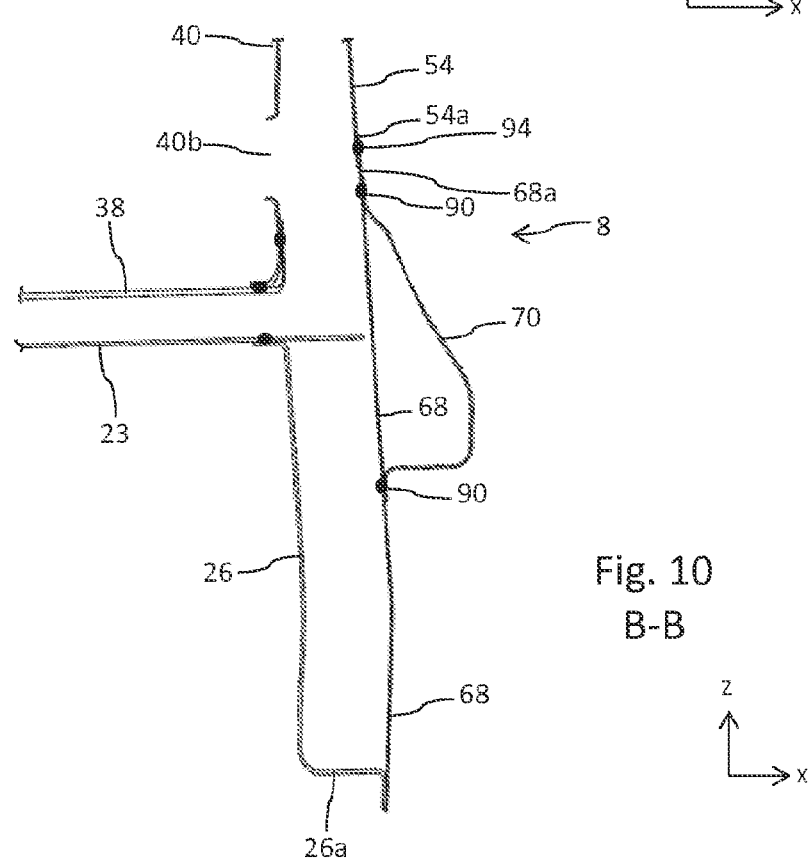
FIG. 10 shows a cross section through the assembly according to FIG. 8 along B-B.
Figure 11:
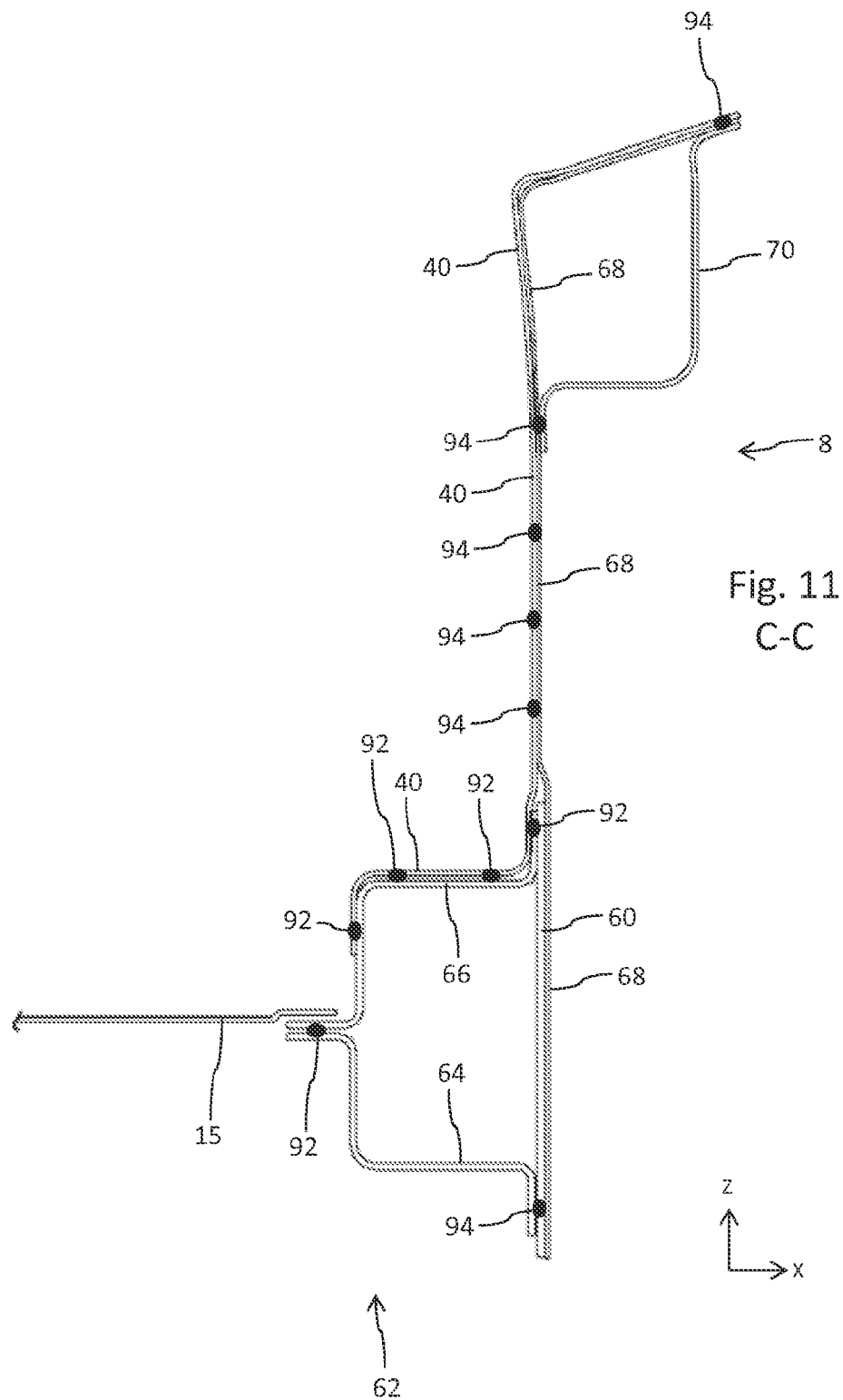
FIG. 11 shows a cross section through the assembly according to FIG. 8 along C-C.

As is evident from the cross section of the FIGS. 10 and 11, the inner edge profile 40 of the inner side wall 30 supports itself on the rear wall 68 almost over the full area in the overlap region with the rear wall 68. However, the rear wall 68 comes to lie against the rear end cross member 62 at the rear end, while the inner edge profile 40 comes to lie towards the front and overlapping the profile of the upper rear end cross member profile 66.

The rear wall reinforcement profile 70 provided with connection flanges and substantially configured L-profile like, together with the rear wall 68 which in its upper end section is bent towards the back approximately L-like or knee-like, forms a largely closed hollow chamber profile.

Compared with FIG. 10, FIG. 15 shows a cross section through the rear-side reinforcement structure 8 which based on the vehicle transverse direction (y) is located further outside. As is evident there, the inner edge profile 40 of the inner side wall 30 supports itself from the top on the upper rear end cross member profile 66 and on the top of the side member 16. The hollow profile formed by rear wall reinforcement profile 70 and rear wall 68 or inner edge profile 40 is only shown in the form of an extract in FIG. 15.

In the further cross section according to FIG. 10, which runs through the outer rear end reinforcement profile 26 and through the left shock absorber reinforcement profile 20, it is noticeable that the outer rear end reinforcement profile 26 supports itself with a lower connection section 26a not only on the side member, as shown in FIG. 16, but also and above all on the rear wall 68. In addition, it is noticeable in FIG. 10, that the left shock absorber reinforcement profile 22 via its rear profile section 23 via the outer rear end reinforcement profile 26 is supported on the rear wall 68. FIG. 10 additionally shows the connection of inner edge profile 40 to the wheel housing 38.

The rear wall 68, in particular its upper end section 68a, comes to lie in a lateral edge region, overlapping with a lower end section 54a of the outer edge profile 54. In this region which is approximately at the height of the belt line of the motor vehicle, the outer edge profile 54 and the inner edge profile 40 form a kind of hollow profile. The inner edge profile 40 includes a passage opening 40b located opposite the transition from the lower end section 54a and upper end section 68a of outer edge profile 54 and rear wall 68 so that in the overlap region of outer edge profile 54 and rear wall 68 for example possible access for welding tongues or similar connecting tools is made available.

Figure 9:
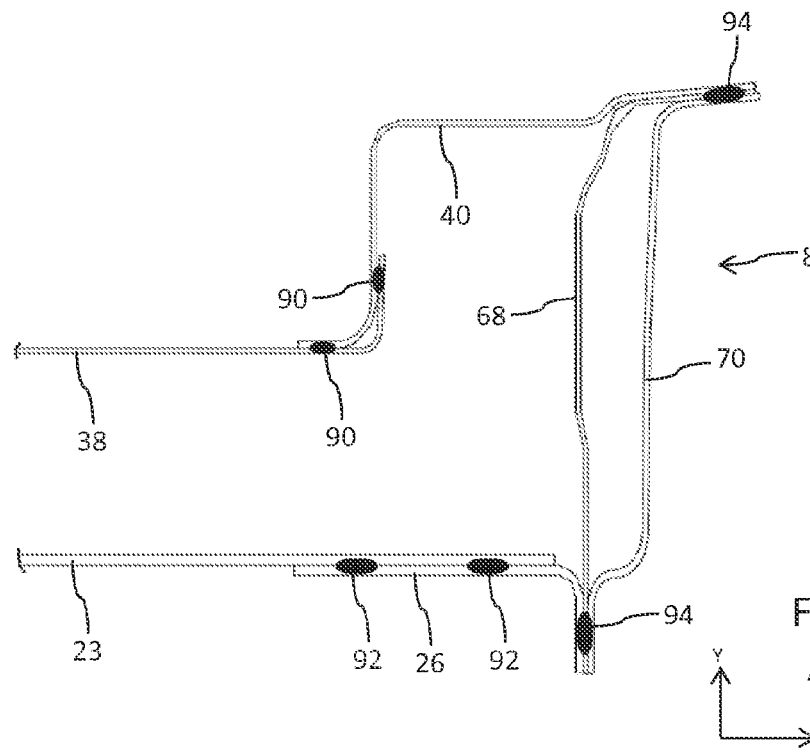
FIG. 9 shows a cross section through the assembly according to FIG. 8 along A-A.

In the cross section according to FIG. 9 it is clearly noticeable, furthermore, that the left shock absorber reinforcement profile 20 via its rear profile section 23 is directly connected to the outer rear end reinforcement profile 26. The outer rear end reinforcement profile 26 which in this region is configured approximately L-shaped or angled is additionally connected via the connection point 94 directly to the rear wall 68, which in this region is additionally also provided with the rear wall reinforcement profile 70.

The rear roof cross member 45, the outer edge profile 54 together with the inner edge profile 40 as well as with the rear wall 68 and the rear wall reinforcement profile 70 as well as the rear end cross member 62 contribute to a continuous reinforcement ring 29 enclosing the rear end opening 7 or framing the rear end opening 7. Accordingly, these are configured as parts of a circumferential reinforcement ring 29.

In that the shock absorber reinforcement profiles 20, 22 are structurally connected on the one hand via the outer rear end reinforcement profiles 26, 28 on the one hand to the side members 16, 18 and on the other hand to the rear wall 68, improved structural connection both of the shock absorber reinforcement profile 20, 22 as well as of the inner side wall 30 to the rear end reinforcement ring 29 can be provided. The wheel housing 38 can be subjected to support via the inner edge profile 40 while left and right shock absorber reinforcement profile 20, 22 receive improved support by means of the outer rear end reinforcement profile 26, 28 that is separated from this.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A rear-side reinforcement structure for a motor vehicle body comprising:
   at least one side member extending in a vehicle longitudinal direction;
   a shock absorber reinforcement profile connected to the side member, the shock absorber reinforcement profile including a lower front profile section and a rear profile section, the lower front profile section extending from the side member, the rear profile section spaced apart from the side member and extending toward a rear end of the motor vehicle body; and
   an outer rear end reinforcement profile, wherein the rear end reinforcement profile is connected to the rear profile section;
   wherein the outer rear end reinforcement profile extends from the rear profile section of the shock absorber reinforcement profile to the side member and is connected to the side member with a lower connection section; and
   wherein the side member, the shock absorber reinforcement profile and the outer rear end reinforcement profile comprise a closed reinforcement frame, and wherein the reinforcement frame substantially extends in a plane formed by a vehicle vertical direction and the vehicle longitudinal direction.

2. The motor vehicle body according to claim 1, wherein the shock absorber reinforcement profile comprises an L-shaped contour.

3. The motor vehicle body according to claim 1, wherein the rear profile section of the shock absorber reinforcement profile is connected to a wheel housing.

4. The motor vehicle body according to claim 1 further comprising a rear wall extending in vehicle transverse direction, which extends over a rear-side end section of the at least one side member.

5. The motor vehicle body according to claim 4, wherein the outer rear end reinforcement profile is connected to the rear wall.

6. The motor vehicle body according to claim 4, wherein the rear wall comprises a rear wall reinforcement profile, which extends parallel to a rear end cross member, the profile cross section of which is closed off by the rear wall.

7. The motor vehicle body according to claim 6, further comprising an inner side wall with a rear-side inner edge profile, which is connected to the rear end cross member and to the rear wall.

8. The motor vehicle body according to claim 7, wherein the inner side wall comprises a connection section for a rear roof cross member which projects to the inside, in vehicle transverse direction.

9. The motor vehicle body according to claim 8, wherein the rear roof cross member, the outer edge profile, the inner edge profile together with the rear wall and one of rear wall reinforcement profile and rear end cross member form a reinforcement ring enclosing a rear end opening.

10. The motor vehicle body according to claim 4, further comprising an outer side wall with an outer edge profile.

11. The motor vehicle body according to claim 10, wherein the outer side wall is connected to the rear wall with a lower end section of its outer edge profile.

12. A motor vehicle with a motor vehicle body according to claim 1.

13. A rear-side reinforcement structure for a motor vehicle body comprising:
   at least one side member extending in a vehicle longitudinal direction;
   a shock absorber reinforcement profile connected to the side member, the shock absorber reinforcement profile including a lower front profile section and a rear profile section, the lower front profile section extending upward from a suspension spring plate, the rear profile section being spaced apart from the side member and extending toward a rear end of the motor vehicle body; and
   an outer rear end reinforcement profile, wherein the rear end reinforcement profile is connected to the rear profile section;
   wherein the outer rear end reinforcement profile extends from the rear profile section of the shock absorber reinforcement profile to the side member and is connected to the side member with a lower connection section.

14. The rear-side reinforcement structure of claim 13, wherein the side member, the shock absorber reinforcement profile and the outer rear end reinforcement profile comprise a closed reinforcement frame.

15. The rear-side reinforcement structure of claim 14, further comprising a rear wall extending in vehicle transverse direction, which extends over a rear-side end section of the at least one side member.

16. The rear-side reinforcement structure according to claim 15, wherein the outer rear end reinforcement profile is connected to the rear wall.

17. The rear-side reinforcement structure according to claim 15, wherein the rear wall comprises a rear wall reinforcement profile, which extends parallel to a rear end cross member, the profile cross section of which is closed off by the rear wall.

18. The rear-side reinforcement structure according to claim 17, further comprising an inner side wall with a rear-side inner edge profile, which is connected to the rear end cross member and to the rear wall.

19. The rear-side reinforcement structure according to claim 18, wherein the inner side wall comprises a connection section for a rear roof cross member which projects to the inside, in vehicle transverse direction.

20. The rear-side reinforcement structure according to claim 19, wherein the rear roof cross member, the outer edge profile, the inner edge profile together with the rear wall and one of rear wall reinforcement profile and rear end cross member form a reinforcement ring enclosing a rear end opening.

* * * * *